US009781231B2

(12) United States Patent
Stuber et al.

(10) Patent No.: US 9,781,231 B2
(45) Date of Patent: Oct. 3, 2017

(54) APPLICATION PLATFORM OPERABLE ON NETWORK NODE

(71) Applicant: Itron, Inc., Liberty Lake, WA (US)

(72) Inventors: Michael T. Garrison Stuber, Newman Lake, WA (US); John Buffington, Hauser, ID (US); Matthew Keith Gillmore, Jackson, MI (US)

(73) Assignee: Itron, Inc.

( * ) Notice: Subject to any disclaimer, the term of this patent is extended or adjusted under 35 U.S.C. 154(b) by 44 days.

(21) Appl. No.: 14/547,561

(22) Filed: Nov. 19, 2014

(65) Prior Publication Data

US 2016/0142514 A1    May 19, 2016

(51) Int. Cl.
  *H04L 29/06* (2006.01)
  *G06F 9/54* (2006.01)
  (Continued)

(52) U.S. Cl.
  CPC ............... *H04L 67/40* (2013.01); *G06F 8/31* (2013.01); *G06F 9/54* (2013.01); *G06F 9/547* (2013.01);
  (Continued)

(58) Field of Classification Search
  CPC ....................................................... H04L 67/40
  See application file for complete search history.

(56) References Cited

U.S. PATENT DOCUMENTS 5,920,720 A * 7/1999 Toutonghi ............... G06F 9/443
                                                712/E9.084
6,334,050 B1  12/2001 Skarby
(Continued)

FOREIGN PATENT DOCUMENTS

DE   102008044915   3/2010
DE   102013106393   12/2013
(Continued)

OTHER PUBLICATIONS

Madden, S. R. et al., Mar. 2005, "TinyDB: An acquisitional Query processing sytem for sensor network", ACM transactions on Database systems.*

(Continued)

*Primary Examiner* — Ranodhi Serrao
*Assistant Examiner* — James Fiorillo
(74) *Attorney, Agent, or Firm* — Lee & Hayes, PLLC

(57) ABSTRACT

A formula-driven programming-environment is described, which may be used to provide an environment for applications to operate within a network node or other computing device. In one example, statements of a program may be interpreted to thereby execute formula-style commands within an address space defined and constrained in a memory device by the integrated development environment. The commands may obtain data, assign values to variables and access data from other node(s) by the interpretation of statements in the program and communicating over a network. The communicating may include queuing a message for transmission by the formula-driven programming-environment. The commands may provide named access or relative access to data in response to the interpretation of statements in the program. The commands may communicate with at least one application located on a remote computing device in response to the interpretation of statements in the program.

17 Claims, 9 Drawing Sheets

(51) Int. Cl.
  *H04L 29/08*    (2006.01)
  *G06F 11/30*    (2006.01)
  *G06F 9/44*     (2006.01)
  *H04W 4/00*     (2009.01)
  *G06F 21/88*    (2013.01)
  *G01D 4/00*     (2006.01)
  *H04L 12/24*    (2006.01)
  *G05B 19/408*   (2006.01)
  *G06F 21/53*    (2013.01)

(52) U.S. Cl.
  CPC .............. *G06F 11/30* (2013.01); *G06F 21/88* (2013.01); *H04L 67/12* (2013.01); *H04W 4/003* (2013.01); *H04W 4/005* (2013.01); *G01D 4/004* (2013.01); *G05B 19/408* (2013.01); *G06F 21/53* (2013.01); *H04L 41/12* (2013.01)

(56) References Cited

U.S. PATENT DOCUMENTS

| | | | |
|---|---|---|---|
| 6,456,097 B1 | 9/2002 | Sutherland | |
| 7,272,518 B2 | 9/2007 | Bickel et al. | |
| 7,523,185 B1* | 4/2009 | Ng | G06F 15/173 370/395.2 |
| 7,583,197 B2 | 9/2009 | Wesby Van Swaay | |
| 8,094,010 B2 | 1/2012 | Wesby-van Swaay | |
| 8,301,386 B1* | 10/2012 | Redmond | G05B 19/408 702/16 |
| 8,639,391 B1 | 1/2014 | Alberth, Jr. et al. | |
| 8,797,018 B2 | 8/2014 | Watkins et al. | |
| 2005/0063317 A1* | 3/2005 | Risberg | H04L 41/12 370/254 |
| 2005/0177646 A1* | 8/2005 | Kawano | H04L 29/12009 709/245 |
| 2006/0167981 A1* | 7/2006 | Bansod | G06F 9/547 709/203 |
| 2007/0247331 A1 | 10/2007 | Angelis et al. | |
| 2008/0089390 A1 | 4/2008 | Picard | |
| 2009/0045976 A1 | 2/2009 | Zoldi et al. | |
| 2009/0276170 A1 | 11/2009 | Bickel | |
| 2009/0299660 A1 | 12/2009 | Winter | |
| 2010/0002348 A1 | 1/2010 | Donolo et al. | |
| 2010/0088431 A1* | 4/2010 | Oshins | G06F 9/468 710/10 |
| 2010/0134089 A1 | 6/2010 | Uram et al. | |
| 2010/0142447 A1* | 6/2010 | Schlicht | H04W 4/20 370/328 |
| 2011/0116387 A1* | 5/2011 | Beeco | H04L 41/0677 370/242 |
| 2011/0122798 A1 | 5/2011 | Hughes et al. | |
| 2011/0126176 A1* | 5/2011 | Kandasamy | G06F 11/3644 717/130 |
| 2011/0215945 A1 | 9/2011 | Peleg et al. | |
| 2012/0117392 A1 | 5/2012 | Turicchi, Jr. et al. | |
| 2012/0169300 A1 | 7/2012 | Rouaud et al. | |
| 2012/0181974 A1 | 7/2012 | Kuniyosi et al. | |
| 2012/0198037 A1* | 8/2012 | Shelby | H04L 41/0213 709/223 |
| 2012/0229089 A1 | 9/2012 | Bemmel et al. | |
| 2013/0024149 A1 | 1/2013 | Nayar et al. | |
| 2013/0035885 A1 | 2/2013 | Sharon et al. | |
| 2013/0076534 A1 | 3/2013 | Conant et al. | |
| 2013/0101003 A1 | 4/2013 | Vedantham et al. | |
| 2013/0110425 A1 | 5/2013 | Sharma et al. | |
| 2013/0241746 A1 | 9/2013 | McKinley et al. | |
| 2013/0242867 A1* | 9/2013 | Bell | H04W 4/005 370/328 |
| 2013/0275736 A1* | 10/2013 | Kelley | G01D 4/004 713/1 |
| 2013/0278437 A1 | 10/2013 | Wyk | |
| 2013/0335062 A1 | 12/2013 | de Buda et al. | |
| 2014/0005964 A1 | 1/2014 | Rouaud et al. | |
| 2014/0012524 A1 | 1/2014 | Flammer, III | |
| 2014/0032506 A1 | 1/2014 | Hoey et al. | |
| 2014/0039818 A1 | 2/2014 | Arya et al. | |
| 2014/0049109 A1 | 2/2014 | Kearns et al. | |
| 2014/0161114 A1 | 6/2014 | Shuey | |
| 2014/0173600 A1* | 6/2014 | Ramakrishnan Nair | G06F 9/461 718/1 |
| 2014/0214218 A1 | 7/2014 | Eldridge et al. | |
| 2014/0330955 A1* | 11/2014 | Bishop | H04L 43/0823 709/224 |
| 2014/0337429 A1* | 11/2014 | Asenjo | H04L 65/403 709/204 |
| 2015/0052088 A1 | 2/2015 | Arya et al. | |
| 2015/0103672 A1* | 4/2015 | Stuart | H04L 45/38 370/241 |
| 2015/0241482 A1 | 8/2015 | Sonderegger | |
| 2015/0241488 A1 | 8/2015 | Sonderegger | |
| 2016/0109491 A1 | 4/2016 | Kann | |
| 2016/0109497 A1 | 4/2016 | Aiello et al. | |
| 2016/0154040 A1 | 6/2016 | Driscoll et al. | |
| 2016/0173237 A1* | 6/2016 | Braun | H04L 1/0056 370/242 |
| 2016/0352103 A1 | 12/2016 | Aiello et al. | |

FOREIGN PATENT DOCUMENTS

| | | | | |
|---|---|---|---|---|
| EP | 1460801 | | 9/2004 | |
| GB | 2426596 | | 11/2006 | |
| JP | 06273200 | | 9/1994 | |
| JP | 2012016270 | | 1/2012 | |
| JP | 2012521596 | | 9/2012 | |
| WO | WO2007063180 | | 6/2007 | |
| WO | WO2009061291 | | 5/2009 | |
| WO | WO2010105038 | | 9/2010 | |
| WO | WO2010110787 | | 9/2010 | |
| WO | WO2014124318 | | 8/2014 | |
| WO | WO 2014124318 A1 * | 8/2014 | | H04L 67/16 |

OTHER PUBLICATIONS

Regehr J., et al., 2008, TinyOS 2.1 adding threads and memory protection to TinyOS. In Proceedings of the 6th ACM conference on Embedded network sensor systems (SenSys '08).*

Snell, James, Oct. 2005, Call SOAP Web services with Ajax, Part 1: Build the Web services client.*

Moritz G. et al., 2011, A CoAP based SOAP Transport binding, IEEE FTFA.*

Berthier R, Sanders WH, Khurana H. Intrusion detection for advanced metering infrastructures: Requirements and architectural directions. InSmart Grid Communications (SmartGridComm), 2010 First IEEE International Conference on Oct. 4, 2010 (pp. 350-355). IEEE.*

Translated Japanese Office Action mailed Oct. 28, 2014 for Japanese patent application No. 2014-511377, a counterpart foreign application of U.S. Appl. No. 13/560,078, 5 pages.

Do, et al., "Open-Source Testing Tools for Smart Grid Communication Network", 2013 IEEE Conference on Open Systems (ICOS), Dec. 2, 2013, pp. 156-161, retrieved on Feb. 7, 2014.

"Health Device Profile", Medical Devices WG, Internet citation, Jun. 26, 2008, pp. 1-44, retrieved from the internet on Nov. 9, 2015 at URL:https://www.bluetooth.org/docman/handlers/Download-Doc.ashx?doc_id=260864&vId=290095&_ga=1.128761092.961309788.1447059724.

Madden, et al., "TinyDB: An Acquisitional Query Processing System for Sensor Networks", ACM Transactions on Database Systems, vol. 30, No. 1, Mar. 1, 2005, pp. 122-173.

Maqousi, et al., "Towards an Open Architecture for Smart Grid Communications: Possible Pointers from Multiservice Network Research", 2013 1st International Conference & Exhibition on the Applications of Information Technology to Renewable Energy Processes and Systems, IEEE, May 29, 2013, pp. 114-118, retrieved on Aug. 29, 2013.

(56) References Cited

OTHER PUBLICATIONS

Office action for U.S. Appl. No. 14/280,286, mailed on Feb. 16, 2016, Sonderegger, "Smart Grid Topology Estimator", 19 pages.
"Open Smart Grid Protocol (OSGP); draft ETSI GS OSG 001", European Telecommunications Standards Institute (ETSI), France, vol. zArchive-ISG, No. VO.1.2, Nov. 15, 2011, pp. 1-250, retrieved on Nov. 15, 2011.
The PCT Search Report and Written Opinion mailed Jan. 28, 2016 for PCT application No. PCT/US2015/056482, 10 pages.
The PCT Search Report and Written Opinion mailed Feb. 18, 2016 for PCT application No. PCT/ US20165/063512, 13 page.
The PCT Search Report and Written Opinion mailed Mar. 2, 2016 for PCT application No. PCT/US2015/061390, 15 pages.
Office Action for U.S. Appl. No. 13/560,078, mailed on Feb. 13, 2015, Hartman Van Wyk, "Automatic Network Topology Detection and Fraud Detection", 22 pages.
Office action for U.S. Appl. No. 13/560,078, mailed on Oct. 2, 2015, Van Wyk, "Automatic Network Topology Detection and Fraud Detection", 29 pages.
PCT Search Report and Written Opinion mailed Oct. 20, 2015 for PCT Application No. PCT/US15/44191, 11 pages.
The Extended European Search Report mailed Sep. 6, 2012 for European patent application No. 12165026.1, 6 pages.
Translated Japanese Office Action mailed Apr. 22, 2014 for Japanese patent application No. 2014-511377, a counterpart foreign application of U.S. Appl. No. 13/560,078, 6 pages.
Final Office Action for U.S. Appl. No. 13/560,078, mailed on Oct. 6, 2014, Hartman Van Wyk, "Automatic Network Topology Detection and Fraud Detection", 34 pages.
Office action for U.S. Appl. No. 13/560,078, mailed on Dec. 16, 2013, Van Wyk, "Automatic Network Topology Detection and Fraud Detection", 23 pages.
Office action for U.S. Appl. No. 13/560,078, mailed on Aug. 15, 2013, Van Wyk, "Automatic Network Topology Detection and Fraud Detection", 16 pages.
The PCT Search Report mailed Jan. 31, 2013 for PCT application No. PCT/US12/34697, 9 pages.

Sharon, et al., Topology Identification in Distribution Network with Limited Measurements, Inovative Smart Grid Technology Conference, Jan. 16-20, 2012, IEEE, pp. 1-6.
Handley, et al., "ComEd Corrects Meter-Transformer Mismatches" ComEd Paper, Sep. 7, 2016, 8 pages.
Hughes, "Augmenting AMI to Radically Reduce Electricity Theft", Metering International, Issue 1, Jan. 1, 2011, pp. 80-83, retrieved from the internet on May 20, 2015 at http://www.metering.com/wp-content/uploads/2013/10/MI-1-2-11.pdf.
Final Office Action for U.S. Appl. No. 13/560,078, mailed on Jul. 1, 2015, Hartman Van Wyk, "Automatic Network Topology Detection and Fraud Detection", 23 pages.
The PCT Search Report and Written Opinion mailed May 22, 2015 for PCT application No. PCT/US2015/017571, 9 pages.
The PCT Search Report and Written Opinion mailed Jun. 1, 2015 for PCT Application No. PCT/US2015/017575.
Short, "Advanced Metering for Phase Identification, Transformer Identification, and Secondary Modeling", IEEE Transactions on Smart Grid, IEEE, USA, vol. 4, No. 2, Jun. 1, 2013, pp. 651-658.
Final Office Action for U.S. Appl. No. 14/280,286, mailed on Aug. 4, 2016, Robert Sonderegger, "Smart Grid Topology Estimator", 20 pages.
The PCT Search Report and Written Opinion mailed Jul. 7, 2016 for PCT application No. PCT/US2016/030144, 12 pages.
Australian Office Action dated Mar. 17, 2017 for Australian Patent Application No. 2015223145, a counterpart foreign application of U.S. Appl. No. 14/280,286, 4 pages.
Berthier et al., "Intrusion detection for advanced metering infrastructures: Requirements and architectural directions", In Smart Grid Communications (SmartGridComm), 2010 First IEEE International Conference on Oct. 4, 2010, pp. 350-355.
Final Office action for U.S. Appl. No. 13/560,078, dated Feb. 24, 2017, Hartman et al., "Automatic Network Topology Detection and Fraud Detection", 33 pages.
Office action for U.S. Appl. No. 14/280,286, dated Mar. 17, 2017, Sonderegger, "Smart Grid Topology Estimator", 13 pages.

* cited by examiner

APPLICATION PLATFORM OPERABLE ON NETWORK NODE

BACKGROUND

As the number and abilities of networked devices increases, the benefit from harnessing the output of such devices also increases. Nodes on a network may have the ability to run one or more applications on a multi-tasking operating system, and to communicate with other nodes on the network. However, many networked nodes may have legally or fiscally relevant functionality—such as utility meters measuring resource consumption. Such nodes may be unable to fully utilize their computational ability due to the risk of compromising their legally or fiscally relevant functionality. Thus, while considerable network resources are theoretically available, legal, monitory, security, network-integrity and/or other considerations may prevent their exploitation.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

As network nodes (e.g., smart utility meters or nodes on other types of networks) increase in number and capabilities, and the Internet-of-things grows, there is both the opportunity and the impetus to deploy flexible application software and/or logic to such nodes. The power and usefulness of metrology devices, sensor devices and control devices on nodes increases when application developers can flexibly deploy their own logic to those nodes. Unfortunately, many network nodes still have limited CPU, memory, or storage resources, which a rogue or unbounded program could potentially corrupt or exhaust.

To enhance network utility and value, a formula-driven programming-environment provides an application platform operable on network node(s). The formula-style programming environment may provide a secure "sandbox" for the execution of applications deployed by network proprietors and third party application developers. The formula-style programming environment may provide a controlled, approved and/or known set of program instructions that may be used by developers to write programs executable by nodes. Such a set of instructions may allow programmers to leverage the functionality provided by the instructions without requiring effort by each programmer to independently develop the instructions. Also, such a set of instructions allows the programming environment to limit the program developers to a defined program instruction set within a defined region of memory or defined "sandbox." The environment may support both obtaining and assigning values for variables and sensor device-generated data. Additionally, the environment may provide intrinsic network communications, including automatic message queuing and limitations to prevent overuse of the network. Additionally, the environment may provide named access to other data sources, including relative access. Additionally, the environment may work in conjunction with a data-center or cloud application to facilitate access to the sensors, including the retrieval and provisioning of data, as well as management of groups and the distribution of formulas.

Example System and Networks

Figure 1:
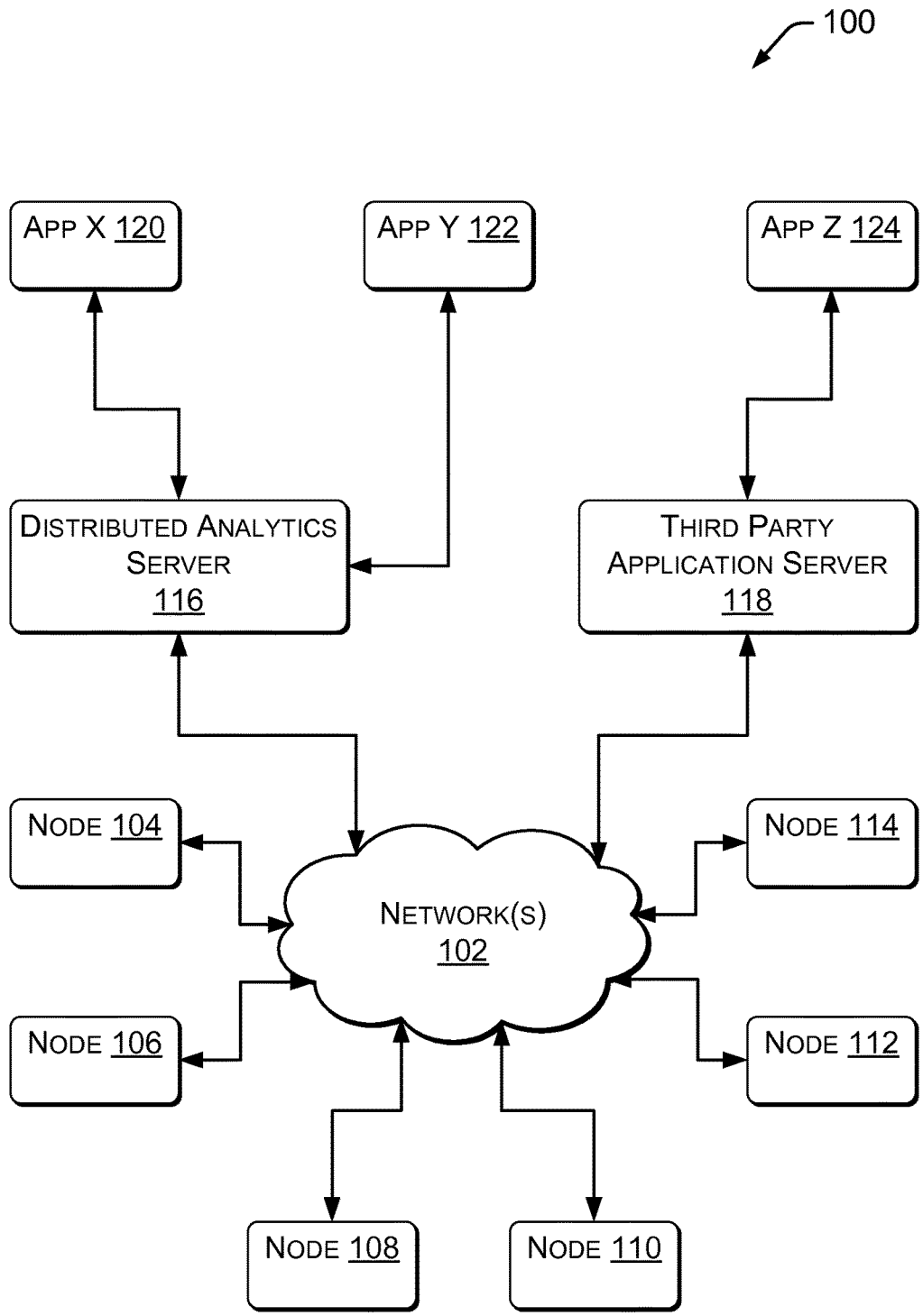
FIG. 1 is a block diagram showing an example network having a plurality of nodes configured to operate applications maintained by a proprietor of the nodes and/or third parties.

FIG. 1 is a block diagram showing an example network 100, having a plurality of nodes that may be part of an advanced metering infrastructure (AMI), a communications network, a control network, and/or other type of network or system. In the network 100 shown, a network 102 may be the Internet, a local area network, a wide area network, a proprietary network, a compound network including different sections, or other network, as available or created. In the example of an AMI, a plurality of nodes 104-114 may be (or be associated with) metering devices (electric meters, gas meters, water meters, etc.), transformers, substations, etc. Other examples of nodes of AMI or other networks include PCs, servers, mobile devices, smart appliances, electric vehicles, home security systems, switches, sensors and other devices. The nodes may communicate with one or more distributed analytics server(s) 116 and one or more third party applications server(s) 118 through the network 102. Analytics may include functionality that analyzes data and network devices to increase electrical grid efficiency, safety and reliability. Distributed analytics server(s) 116 may include server(s) that may be configured and located in a manner that allows communication with, and support of, a plurality of network nodes. Such distributed analytics servers may be configured for operation of analytics software that performs many functions, and which may be executed all or in part by processing units in a plurality of locations across a smart grid network. The nodes may communicate using a "star" configuration as shown, wherein each node communicates directly over the network 102. Alternatively, nodes may communicate using a "mesh" configuration, wherein one or more nodes communicate through other nodes to relay messages to the analytics server 116 and/or applications server 118. One or more of the plurality of nodes 104-114 may be configured to operate one or more software applications and/or other logic maintained by a proprietor of the nodes or network and/or third parties.

The distributed analytics server 116 may be configured to operate or execute one or more applications 120, 122. The applications may be back office applications, and may be associated with functionality including customer pre-payment, billing, electrical load management, home security, etc.

A third party applications server 118 may also be configured to run one or more applications, such as application 124. In one example, the third party application server may support, manage, or otherwise communicate with equipment located on a customer's site, such as solar panels or windmills.

Figure 2:
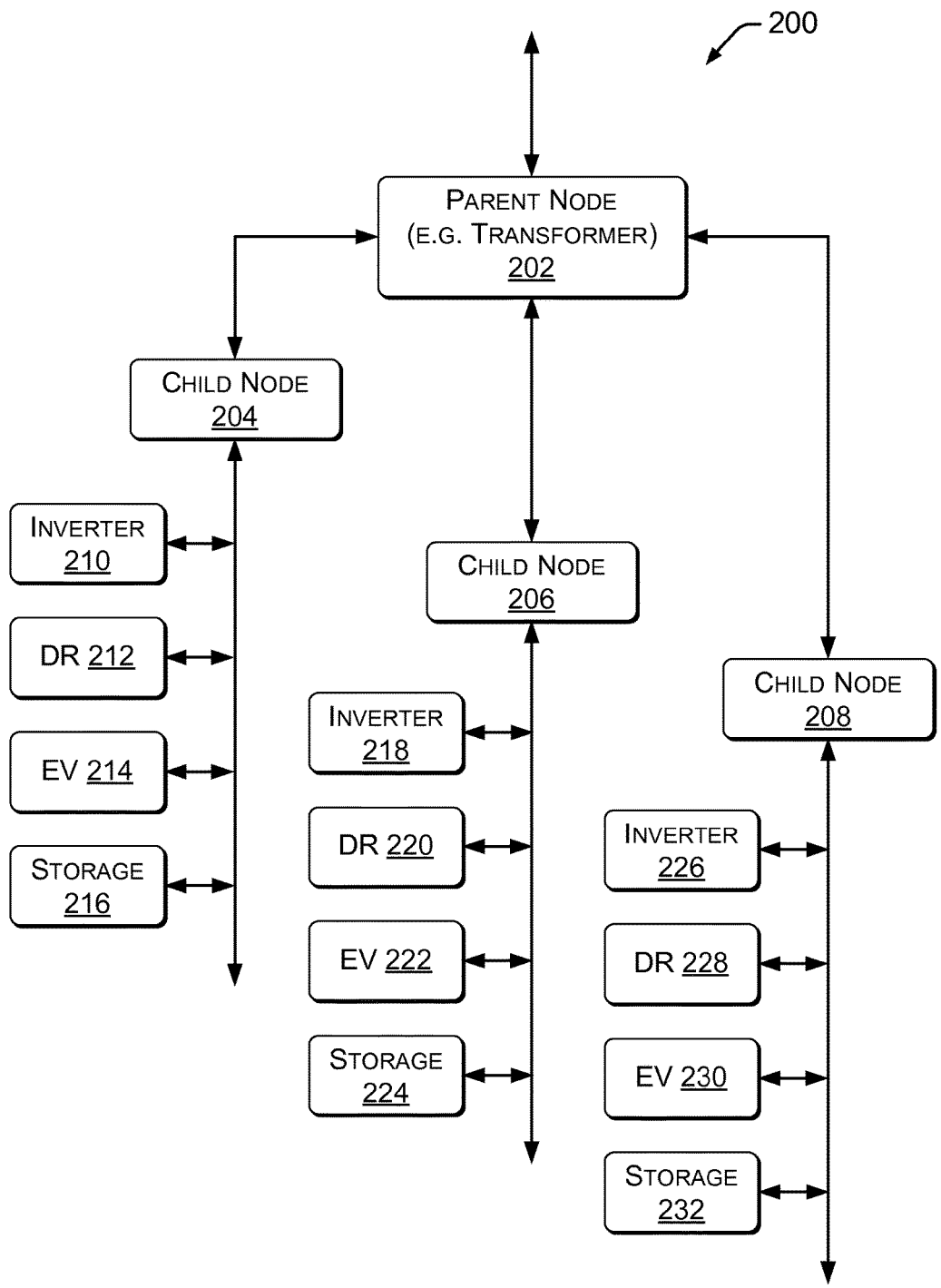
FIG. 2 is a block diagram showing an example network having a plurality of nodes configured, for example, for electrical consumption, generation and/or storage, and for execution of software applications to control, support and facilitate those functions.

FIG. 2 is a block diagram showing an example network 200 in an AMI setting. In other contexts, the network 200 may be representative of a generic network in other settings, such as information technology (IT), manufacturing, retail, health care, etc. The example network 200 includes a plurality of nodes configured for electrical consumption, generation and/or storage, and for execution of software applications to control, support and facilitate those functions. In such contexts, the nodes may be configured for network and monitoring inventory, tracking, environmental monitoring, physiological sensors, patient monitoring, or numerous other functions.

Referring back to the AMI example, parent node 202 may be associated with a transformer or other device. The transformer may serve a plurality of customers, each of which may be associated with a child node 204-208. Each child node may be associated with one or more devices, such as an inverter 210, 218, 226, metering devices such as data reader 212, 220, 228, an electric vehicle 214, 222, 230 and/or charging station(s), and energy storage 216, 224, 232 (e.g., batteries, such as within the electric vehicles or other battery backups, fuel cells, generators, etc.).

In one example, one of the nodes 202-208 (or an application running thereon) may recognize a problem or other event. The problem may be of any type or origin. For example, the parent node may be unable to receive data from one of the child nodes. Alternatively, the problem may be that one of the child nodes may have lost contact with a distributed analytics server 116 or third party application server. In a still further alternative, batteries in an electric vehicle 214 may be discharging through the inverter 210 rather than charging. To determine a location of the fault, it may be advantageous to determine if the problem is also recognized by other nodes in the network, such as parent, child and/or sibling nodes. Such recognition may serve as confirmation of the fault, and may provide information on the type and location of the fault. In one example, one or more nodes may determine if the problem was recognized by a parent of the node (i.e., the suspected fault location), any child nodes of that node, or any sibling nodes of the node. If the problem was recognized by a confirming node, there is a higher likelihood that the fault was accurately attributed to a particular node. Otherwise, additional investigation may be required.

Example Network Nodes

Figure 3A:
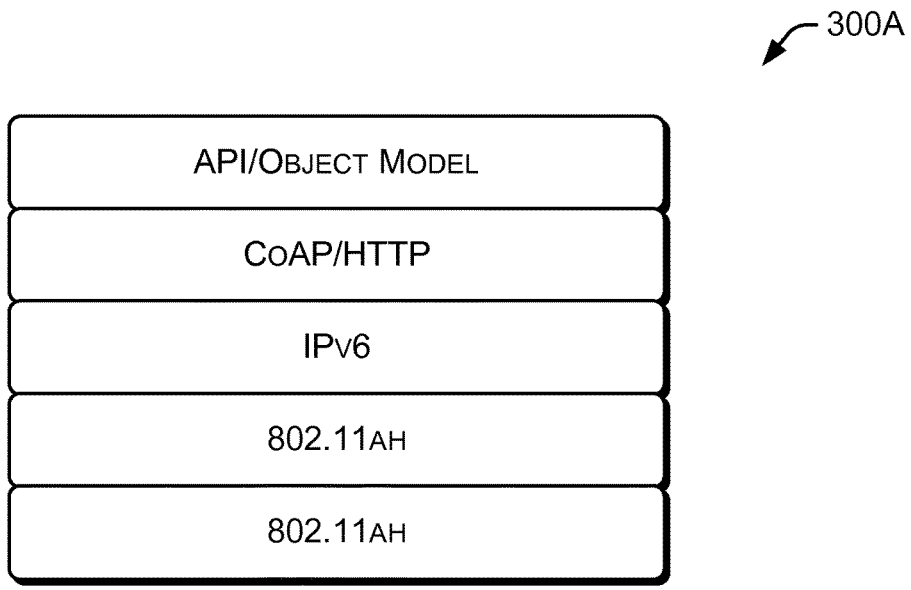
FIGS. 3A and 3B are block diagrams showing two example communications architectures for use with a node in any of the example networks.
Figure 3B:
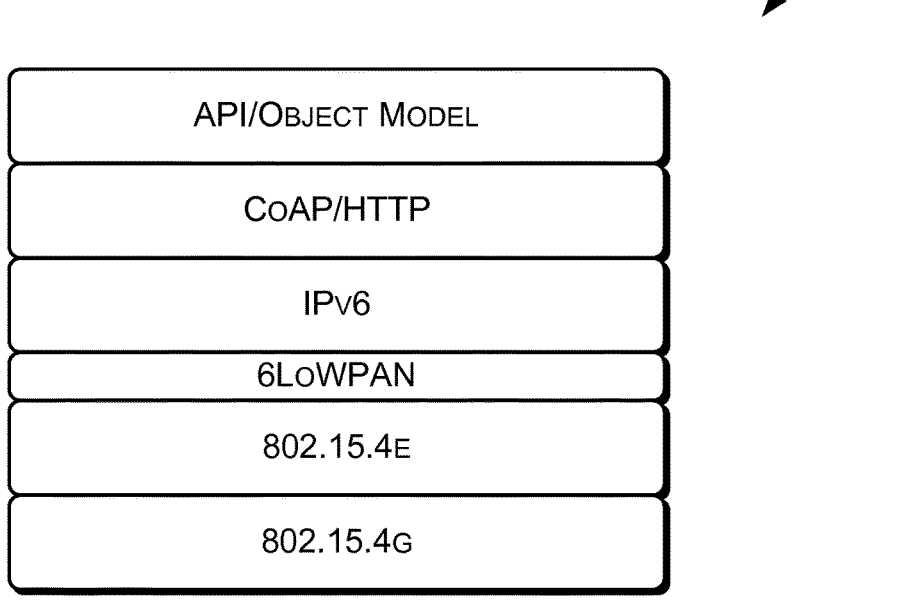

FIGS. 3A and 3B are block diagrams showing two example communications architectures 300A, 300B for use with a node in example networks 100 and/or 200. In one example, a communications architecture for formula-driven programming-environment may be highly layered, may emphasize an agnostic PHY/MAC layer, and may include an IPv6 layer. Accordingly, FIGS. 3A and 3B may be configured according to any desired modern protocol layering technology. In one example, a classic five layer configuration (Application, Transport, Network, Medium Access Control (MAC), and Physical) may be utilized.

Figure 4:
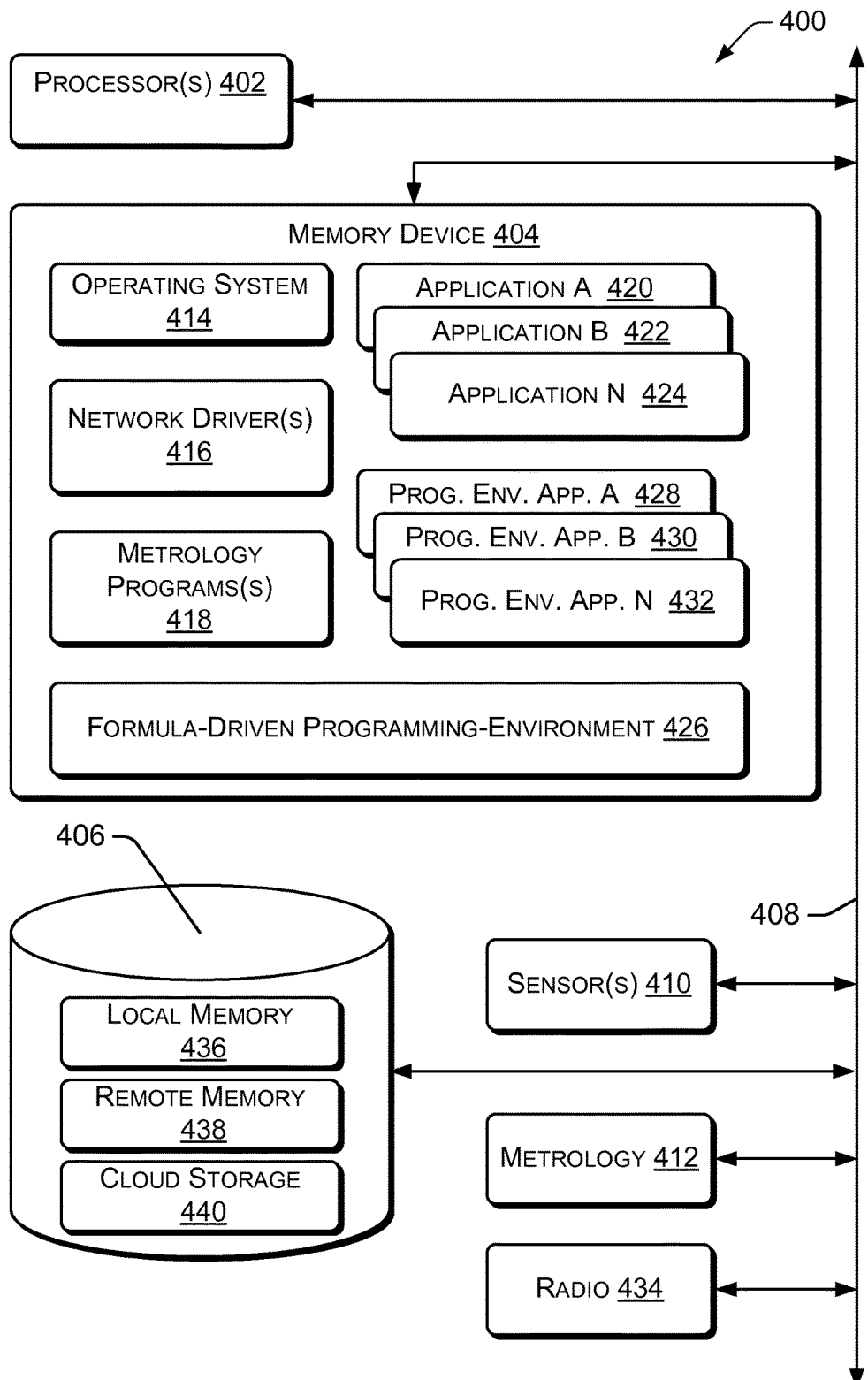
FIG. 4 is a block diagram showing a node, within which software and/or hardware logic defines an embedded system having an example formula-driven programming-environment.

FIG. 4 is a block diagram showing a node 400 configured to execute applications within, and/or using, a formula-driven programming-environment. The node 400 may be located within a network, such as networks 100, 200, including networks configured as part of an AMI and networks not configured as part of an AMI. One or more processors 402 may access one or more memory devices, including random access (e.g., flash) memory 404 and/or disk or other persistent memory 406 over a bus 408, printed circuit board or other conductors. One or more sensors 410, such as tamper detectors, environmental sensors, etc., may be communicatively coupled to the processor 402. Metrology devices 412, such as those used to measure electrical, gas or water consumption, etc., may be accessible to the processor(s) 402. The memory 406 may include one or more of a local memory device 436 (e.g., flash memory, disk memory or other technology), a remote memory device 438 and/or cloud storage 440.

Within memory device 404, an embedded system or operating system 414 may be open sourced or proprietary. One or more network drivers 416 may operate communications circuits and/or radio(s) 434, to provide communications functionality. One or more metrology programs or applications 418 may operate the metrology hardware 412, and perform functions such as recording consumption data, monitoring for theft or tampering, and communicating with a head office. One or more applications 420-424 may be configured to operate on the node 400, utilizing the operating system 414.

A formula-driven programming environment 426 is configured to operate one or more programming environment applications 428-432. Such applications may operate within the constraints of, and using the functionality provided by, the formula-driven programming environment 426. The environment 426 may provide support for obtaining and/or assigning values for variables and sensor- and/or metrology-generated data. The environment 426 may provide intrinsic network communications, including automatic message queuing and limitations that prevent overuse of the network. The environment 426 may provide named access and/or relative access to nodes, devices, servers, etc. The environment 426 may work in conjunction with a data-center or cloud application to facilitate access to the sensors, including the retrieval and provisioning of data, as well as management of groups and the distribution of formulas.

In one example, the formula-driven programming environment 426 may include a rules engine and/or a calculation engine. Either or both may be configured to utilize resources provided by the embedded system using both local addresses and relative addresses of nodes and data on the network.

Example Formula-Driven
Programming-Environment

Figure 5:
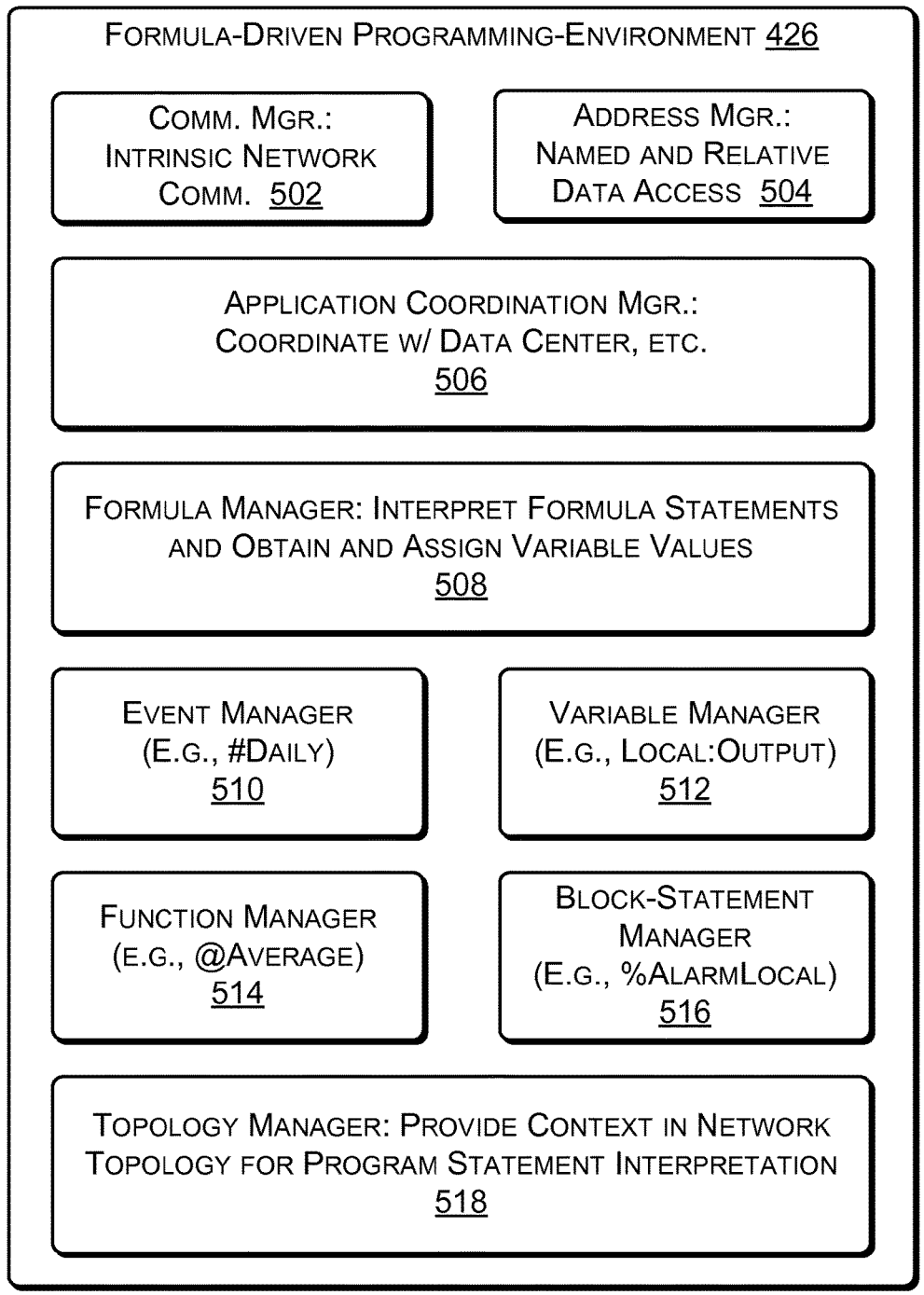
FIG. 5 is a block diagram showing an example configuration of a formula-driven programming-environment.

FIG. 5 is a block diagram showing an example configuration of a formula-driven programming-environment 426. In one example, the formula-driven programming-environment 426 provides a sandbox environment for applications on sensors, meters, network nodes, etc. The sandbox environment allows applications to provide intended functionality without interfering with other elements, such as: other applications; an embedded system; legally relevant, consumption and/or other data; or other aspects of a node or a network. The sandbox environment may also prevent applications from: delaying end-of-interval processing; impacting data accuracy; violating OILM legally relevant/non-legally relevant memory address boundaries; flooding a network with data; and/or crashing a meter or other platform on which the sandbox environment was operating. Thus, the integrated development environment 426 limits interpretation of commands to a defined and/or limited area of memory and may limit program utilization to prevent excessive resource consumption.

The formula-driven programming-environment 426 may be configured to provide access to sensor data to both local and remote processes. The formula-driven programming-environment 426 may be configured to make at least some aspects involving communications of sensor data over a network transparent to application developers. In one example of such transparency, an application configured to operate within, or using, the formula-driven programming-environment 426 does not have to be programmed with some network communication information (e.g., full addressing). As a convenience to application developers, such aspects may be handled by the programming environment, thereby making such issues transparent to the developers. In one example, the topology manager 518 provides a context, indicating a type of address that should be provided to network communications.

A communications manager 502 may be configured to provide intrinsic network communications to one or more applications (e.g., applications 428-432 of FIG. 4, operable using the formula-driven programming-environment 426). The intrinsic network communications may include automatic message queuing and/or limitations that prevent messages, data or communications from flooding of all or part of a network. The automatic queuing and/or limitations may confine transmission using one or more thresholds, enforcement of which prevents network flooding or overuse.

Operation of the communications manager 502 may render message queuing to be "transparent" to the application programmer and/or to the application. Advantageously, transparent communications do not require the programmer to handle low-level programming related to message addressing, queuing and/or transmission. Instead, communications may be supported transparently (i.e., in a manner not required to be seen or worked on by applications programmers) by the formula-style programming environment 426, which performs low-level coding and addressing as required for message queuing. In one example, the formula-driven programming-environment 426 may queue a message, such as sensor data, for transmission over the network without requiring an applications programmer to provide a full or actual address. Instead, the programmer may provide only a relative address (e.g., such as indicating that the destination is a parent of the node from which the message was sent). In an example, queuing a message for transmission (such as by operation of, or within, the formula-driven programming-environment) may include transparent message queuing of sensor data for transmission over a network. In a further example, messages queued for transmission by the formula-driven programming-environment may include sensor data, constants, variables, derived data and/or commands, etc. Accordingly, a programmer within the formula-driven programming-environment may write code without extensive knowledge of the underlying functionality of the network.

An address manager 504 may be configured to provide one or more addressing mechanisms. In different examples, addressing syntax may be configured according to a number of formats, such as:

[Node]:variable;
[Node]:#formula; or
ServicePointName:Channel[TimeOffset].

In the context of an AMI network, [Node]:variable indicates a variable at a particular network location or node. Similarly, [Node]:#formula indicates a formula performed at a particular network location. And further, the term service point name (or the variable ServicePointName) may be a name of a node in the network. Other nodes in other types of networks may be differently named.

An applications coordination manager 506 may be configured to coordinate operation of applications (e.g. applications utilizing the formula-driven programming-environment 426 and operating on a network node) with one or more applications operating on a remote data-center. The remote data-center may be the distributed analytics server 116, the third party applications server 118 (both seen in the example of FIG. 1), or other computing device. The applications coordination manager 506 may operate on a node (e.g., one of nodes 104-114 of FIG. 1) and may assist in the operation of applications that utilize the formula-driven programming-environment 426 in a variety of ways. In one example, the applications coordination manager 506 may coordinate with applications operating on the data center, and may assist them to access sensors on the node, send commands to the node, and/or retrieve provisioned data from the node. In another example, applications coordination manager 506 may coordinate with application(s) operating on the remote data center to manage functionality within the formula-driven programming-environment 426. In such an example, the applications coordination manager 506 may coordinate with remotely operating program(s) to utilize one or more formulas, events, variables, functions, and/or statement blocks, etc. in an application operating on the node.

A formula manager 508 may enable applications (e.g., applications 428-432 of FIG. 4) to create, receive, evaluate and utilize formulas, which may be defined by, and/or responsive to, events, variables, functions, block statements, and/or other techniques. The formula manager 508 may be configured to interpret statements within applications (e.g., applications 428-432 of FIG. 4) configured for operation in conjunction with the formula-driven programming-environment 426. Such functions and/or program statements calling the functions may be used by developers of applications utilizing the formula-driven programming-environment 426 in desired combinations and to achieve desired results. The formula manager 508 may include a rules engine and/or a calculation engine, which may be utilized to interpret program statements according to a predefined set of rules and calculations.

An event manager 510 may enable applications (e.g., applications 428-432 of FIG. 4) to respond to, and utilize, events. The event manager 510 may recognize an event (e.g., a reboot, the start of a new day or hour, an alarm, etc.) and cause an appropriate instruction(s) or program(s) to be executed in response. Thus, instructions may be created and/or associated with events by application designers, and accessed by applications utilizing the formula-driven programming-environment 426. In one example, a formula syntax is expressed, which in the examples is shown as the character "#", however another character(s) may be used in other examples to denote formula syntax. After the formula syntax is expressed, an event may be defined. In one example, an event may be defined as: #Hourly( )[ ], which executes statements (not shown for brevity) upon the event (i.e., start of a new hour). In another example, the event manager 510 responds to an event notification and triggers one or more events, which may include: a variable assignment to put data into appropriate data structures; a functional evaluation to calculate a value of a function given an input value; and/or statement interpretation within the formula-driven programming-environment. In a further example, the event manager 510 may define a plurality of events, provide notice upon occurrence of an event from among the plurality of events, and execute a block of statements in response to the notice.

A variable manager 512 may enable applications (e.g., applications 428-432 of FIG. 4) to create, assign, transmit, request, receive, obtain and utilize variables. The variable manager 512 may define a variable to be local (e.g., on the node utilizing the formula-driven programming-environment 426) or remote (e.g., on a remote node or server, such as distributed analytics server 116 of FIG. 1). Such variables may be created, defined and/or used by application designers, and accessed by applications utilizing the formula-driven programming-environment 426. In one example, a variable may be defined by expressions of a storage location (e.g., a node or other computing device), a syntax, and a variable name. In one example, the syntax may utilize the character ":". Accordingly, an example variable may be defined as "local:threshold," which defines a local variable (e.g., on the node using the formula-driven programming-environment 426), the variable syntax, and a variable name "threshold." In another example, the variable definition manager may use a two-part format, including a location on which variable information is stored and a name of a variable.

A function manager 514 may enable applications (e.g., applications 428-432 of FIG. 4) to create and utilize formulas. Such formulas may be provided to, and/or used by, application designers, and accessed by applications utilizing the formula-driven programming-environment 426. By providing applications designers with a rich set of functions, the function manager 514 allows such designers to create productive applications while preventing such applications from breaking rules that protect the node, data and other applications. In one example, a formula syntax is expressed, which in the examples is shown as the character "@", however, in other examples other characters may be used to designate formula syntax. After the formula syntax is expressed, a formula may be defined. The formula may be named (e.g., "SetAlarmThreshold" or "NewValue"). The formula may have one or more input values or arguments. In one example, a formula may be defined as: @if((local: BaselineOutput<local:threshold), AlarmServer). Such a formula may be evaluated by the formula-driven programming-environment 426 as a program is executed or interpreted. In a further example, a function definition may include a syntax indicating a function, and a call to the formula-driven programming-environment 426 or to the embedded system or operating system 414. The function execution manager 514 may be configured to restrict functions to only those provided by the formula-driven programming-environment 426. This prevents applications designers from creating functions that harm other applications or data.

A block statement manager 516 may enable applications (e.g., applications 428-432 of FIG. 4) to configure and/or utilize blocks of statements, formulas, etc. Such blocks may be created and/or used by application designers, and accessed by applications utilizing the formula-driven programming-environment 426. In one example, a block-statement syntax is expressed, which in the examples is shown as the character "%", however, in other examples other character(s) may be used to designate block statement syntax. After the block-statement syntax is expressed, a block of statements, functions, etc., may be defined. In one example, a block may be defined as:
%AlarmLocal=@Display("Output is", local:TrailingOutput, "percent of normal and", local:RelativeOutput, "percent of peers.").

In this example, the block-statement utilizes a function (e.g., defined by the syntax "@") and variables. In other examples, additional or different statements may be chained together to form a longer block. In the example shown, the name of the block, in this case %AlarmLocal, may be used as a shorthand to invoke all of the statements of the block. In a further example, the block of statements may include at least one of: a statement executed in response to an event; a function; and/or a name of a block of statements. And in a still further example, the block of statements may be indicated by a defined syntax; a name of the block of statements, which may be located with respect to the defined syntax; and, a plurality of statements to be associated with the name of the block of statements.

A context or topology manager 518 may be configured to cause the interpretation of formula statements, and the acquisition and assignment of variable values, to be performed in the context of a particular network topology. Moreover, the topology manager 518 may be configured to utilize a particular network topology that may be based on a particular use or function to which the network or statements are based. Thus, the topology manager 518, may be used to provide different views of relative relationships of network topology, depending on context or usage. In one example, an application on a meter regarding a windmill in a customer's backyard might regard "upstream" as a pathway to servers associated with the windmill manufacturer. In contrast, another application running on the meter may regard "upstream" as a pathway to the utility company's head office. Thus, some functions or formulas within the formula-driven programming-environment 426 might be given different meaning by the topology manager 518 due to use of a different topology, which may be dependent on context. Advantageously, third party programmers could consider the network topology from their own perspective, which may be validated by the topology manager 518 of the formula-driven programming-environment 426.

Thus, the formula-driven programming-environment 426 supports operations using relative relationships. This allows nodes to communicate with other nodes based on some characteristic that defines their relationship. Advantageously, use of relative relationships may avoid the need for explicit addressing in the applications-development process. The formula based programming environment 426 may reference, for example, a parent node, a child node, or a sibling node. Programs written according to such references may be deployed across many nodes. Thus, particular nodes may utilize statements that are generically written, rather than specifically written for the particular node. In execution and/or interpretation, an intended context or network topology may be utilized, to thereby apply specific meaning to more generally written programming statements.

The topology manager 518 may inform applications running on the node of management of relationships between nodes, such as by using network topology to provide context for program statement interpretation. In a further example, a given node may have one "parent" node for network communications, a different "parent" node for physical operations (such as a "parent" node in an electrical distribution network), and yet a different "parent" node for monetary operations. Thus multiple instances of relative relationships may be managed by the topology manager 518, including but not limited to, multiple parent, child, and sibling relationships. Thus, using the network communications hierarchy a generic formula could be written to determine data rates of children and siblings. Also, using the electrical connectivity hierarchy a generic formula could be written to determine the electrical consumption of child nodes. In both cases these generic formulas could be propagated across a plurality of nodes, which might have indeterminate numbers of children. This single generic formula could be propagated across a wide variety of nodes, which might have indeterminate numbers of children and siblings.

Thus, the topology manager 518 may allow the formula-driven programming-environment 426, or a network or system operator, to define multiple topologies based on any of multiple criteria(s), including, but not limited to, communications, physical connectivity, economic relationships, spatial relationships, demographic characteristics, and regulatory characteristics. A selected one of the multiply defined topologies may be utilized as indicated by particular circumstances.

Figure 6:
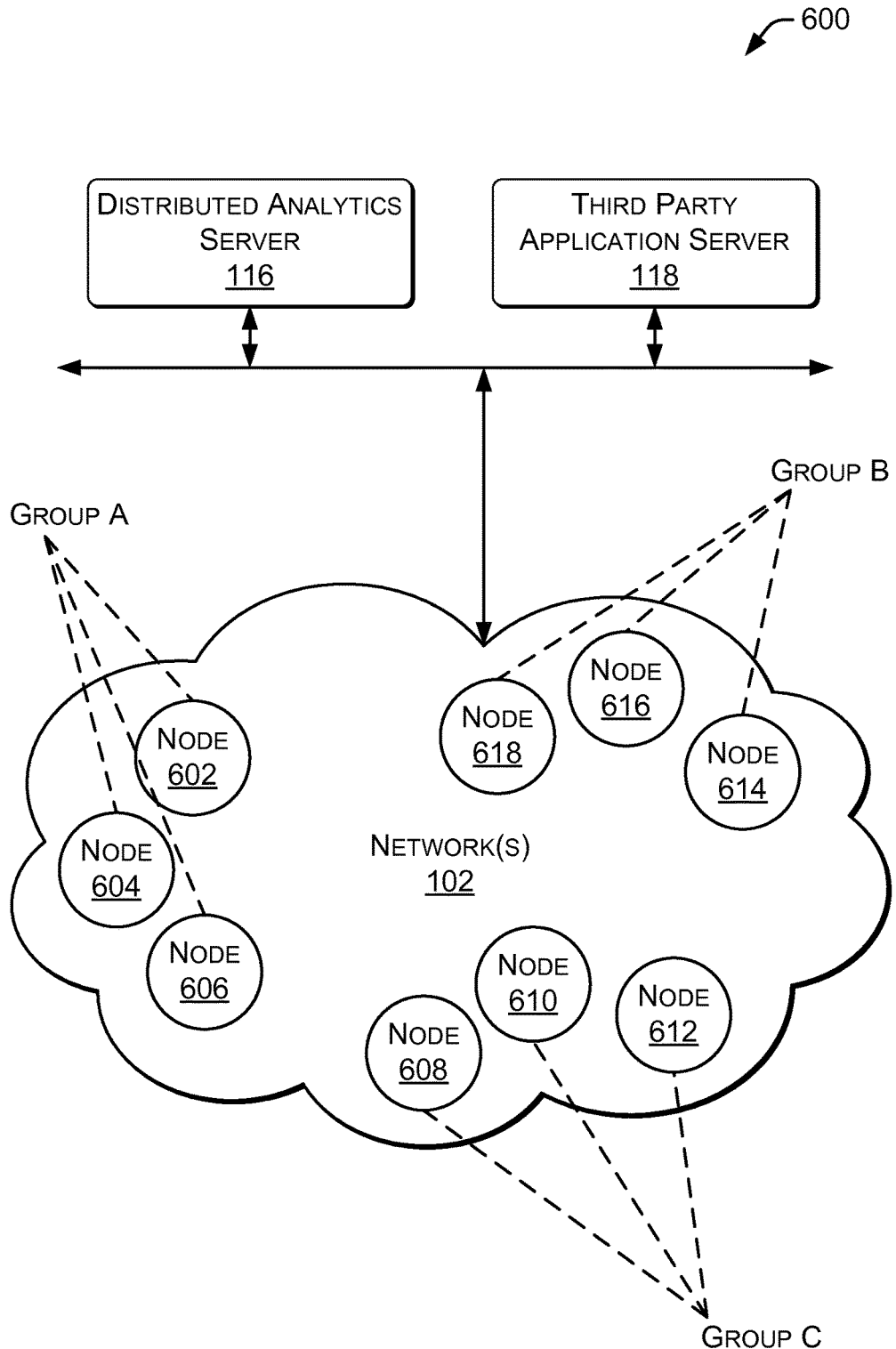
FIG. 6 is a block diagram showing an example network, including a plurality of nodes configured to utilize the formula-driven programming-environment.

FIG. 6 is a block diagram showing an example network 600 having a plurality of nodes 602-618 configured for communication with a distributed analytics server 116 and/or with one or more third party application servers 118. The network 600 provides an illustrative example of logic operable within a formula-driven programming-environment 426 that facilitates solar power production and/or consumption.

In an example, a third party vendor (where a utility company and the utility's customer are the first two "parties") may provide solar power generation monitoring and facilitating services. The vendor may offer the service to owners of solar arrays and/or to end users of the solar power. The service may include software to monitor solar output and provide feedback, such as if the output is lower than indicated by conditions. The service may also provide an alarming function to utilities warning them if the average output from a solar power-generating array drops suddenly or unexpectedly.

The formula-driven programming environment 418 may support a variety of data-access and mathematical operations that facilitate the services provided by the third party vendor. In one example, the formula-driven programming environment 418 may support tying instructions or blocks of instructions to event(s). Events may be predefined, and associated with activity on a node, a device attached to a node (e.g., the solar array, an electric meter, a transformer, etc.) or other network element. An example syntax references events with a "#" symbol, followed by a name of the event, followed by one or more statements in brackets. Some of the events described herein may require and/or accept parameters.

As an example of programming of one or more nodes 602-618, the following events may be predefined:

Now[ ]—This event executes or processes when it is received by the node or device. Such an event may be useful for once-only calculations.

EOI[ ]—This event processes when metering end-of-interval calculations are complete.

Reboot[ ]—This event processes when the node or device is rebooted (typically after a power restoration or update).

Daily( )[ ]—This event processes daily at the time indicated in the parameter, or a randomly chosen, but at a consistent time of day if "R" is specified. If no time is provided, processing may occur at midnight.

Hourly( )[ ]—This event processes hourly at a consistent minute if "R" is specified indicated in the parameter (0-59), or a randomly chosen minute. If no minute is provided, and randomness is not indicated, then processing occurs at the top of the hour.

Alarm( )[ ]—This event processes whenever the specified alarm occurs.

Input( )[ ]—This event processes whenever the specified input occurs (e.g. a button press).

Change( )[ ]—This event processes whenever the specified variable changes. In one example, the variable is a local variable remotely set through the distributed analytics server 116.

To continue the example operation of nodes 602-618, if particular logical sequences are commonly executed, it may be useful to allow for a definition of named blocks of statements. Named blocks can be referenced by a selected syntax, such as the "%" symbol, followed by the name of the block. Such blocks can be defined by assigning a set of statements to them. As an example of such a block:

%MyEOIRoutine=@if(@variance(5, local:1, DAserver: baseline), DAserver{local}:thresholdalarm+=@date).

By combining techniques, a block of statements can be tied to one or more events, such as in the example:

EOI[%MyEOIRoutine]

Using such logic, the third party vendor may make several comparisons. In one example, an application of the vendor may compare current output to trailing output. In a second example, the application may compare current output to neighboring output. And in a third example, the application may compare current output to a regional baseline. If the weather has changed the output of the solar array, and a relative output to the trailing output exceeds an alarm threshold, the vendor's application may use logic to place a notification on a screen (e.g., at the distributed analytics server 116). The alarm may also result in a notification being sent to the user's mobile device. If the weather-adjusted output, relative to neighboring output, is low, an alert may be provided to the user and/or the utility. Finally, if the weather-adjusted output, relative to a baseline, is low, an alert may be provided to the utility.

In one example, some of the above-indicated functionality may be performed by creation and utilization of the following variables and routines.

local:2 /*This variable is the kWh channel recording the energy produced by the solar panels*/ local:threshold /*This variable is the threshold below which the system should alarm*/ local:adjusted /*This variable is the kWh channel storing the weather adjusted solar output*/ local:weather /*This variable is pushed from the distributed analytics server 116. A scale of 0-5 may be used to represent a weather adjustment factor*/

%AlarmLocal=@HANDisplay("Solar output is", local: TrailingOutput, "% of normal and", local:RelativeOutput, "% of peers."); /*this formula creates a local alarm which places a message on a Home Area Network display indicating that the solar output is some percentage of normal output*/
%AlarmServer=DAServer{local}:
  OutputAlarm=@CurrentDateTime; /*this sets the variable OutputAlarm at the DAServer, specific to the local node, equal to the current date and time*/ DAServer{local}:TrailingOutput[@CurrentDateTime]=local:TrailingOutput; /*this sets the TrailingOutput value at the DAServer, specific to the local node, equal to the trailing output*/ DAServer{local}:RelativeOutput[@CurrentDateTime]=local:RelativeOutput; /*this sets the RelativeOutput at the DAServer, specific to the local node, equal to the relative output*/ DAServer{local}:BaselineOutput[@CurrentDateTime]=local:BaselineOutput; /*this sets the BaselineOutput at the DAServer, specific to the local node, equal to the baseline output*/
%AlarmAll=%AlarmLocal; %AlarmServer; /*this defines the formula AlarmAll as the formulas AlarmLocal and AlarmServer, thus when AlarmAll is activated, AlarmLocal and AlarmServer are activated*/
%CalcAdjust=local:adjusted=local:2/(0.20*local:weather); /*this defines the CalcAdjust formula as setting the local variable adjusted equal to channel 2 of data divided by the quantity of the constant 0.20 multiplied by the local variable weather*/
%ChkTrailing=local:TrailingOutput=@iAverage(1d, local:adjusted/@average(local:adjusted[−3d], local:adjusted[−2d], local:adjusted[−1d])); /*this defines the ChkTrailing formula as the setting the local variable trailingOutput to the a day's worth of interval data, based on the average of the three previous days*/ %ChkNeighbor=local:RelativeOutput=@ iAverage(1d, local:adjusted/@average(local{siblings}:adjusted)); /*this defines the ChkNeighbor formula as setting the local variable RelativeOutput to one day's interval data, averaging the local adjusted data with the average of the local adjust data of sibling nodes*/
%ChkBaseline=local:BaselineOutput=@iAverage(1d, local:adjusted/DAServer{local}:baseline); /*this defines the ChkBaseline formula as setting the local variable BaselineOutput to one day's interval data, averaging the local adjusted data and the baseline stored at the server DAServer for this particular node*/
EOI[ %CalcAdjust;] /*this adds the formula CalcAdjust to the list of formulas to be executed when an End-of-Interval event occurs*/
Hourly(R)[%ChkTrailing; %ChkNeighbor; %ChkBaseline; @if((local:TrailingOutput<local:threshold)||(local:RelativeOutput<local:Threshold), %AlarmAll); @if((local:BaselineOutput<local:threshold), %AlarmServer);] /*this statement tells the scheduler to execute the named formulas ChkTrailing, ChkNeighbor, and ChkBaseline, and the two unnamed if statements every hour. The first if statement will cause the AlarmAll named formula to be executed if the local variable TrailingOutput is less than the local variable threshold, or if the local variable RelativeOutput is less than the local variable threshold. The second if statement will cause the AlarmServer named formula to be executed if the local variable BaselineOutput is less than the local variable threshold.*/

To continue the example, the above set of formulas may be pushed to some or all nodes within the network 600. Using random timing, each node 602-618 may pick its own time to calculate, retrieve data, and alarm.

To minimize need for each node to contact many other nodes, nodes may be configured into sibling groups (e.g., Group A, Group B and Group C). As a result, Group A may inquire about local output from Group B and Group C; Group B may inquire of Group A and Group C, and so forth.

Example Methods

In some examples of the techniques discusses herein, the methods of operation may be performed by one or more application specific integrated circuits (ASIC), field programmable gate arrays (FPGA), or may be performed by a general purpose processor utilizing software defined in computer readable media, or by other hardware devices as desired. In the examples and techniques discussed herein, the memory 404 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

Figure 7:
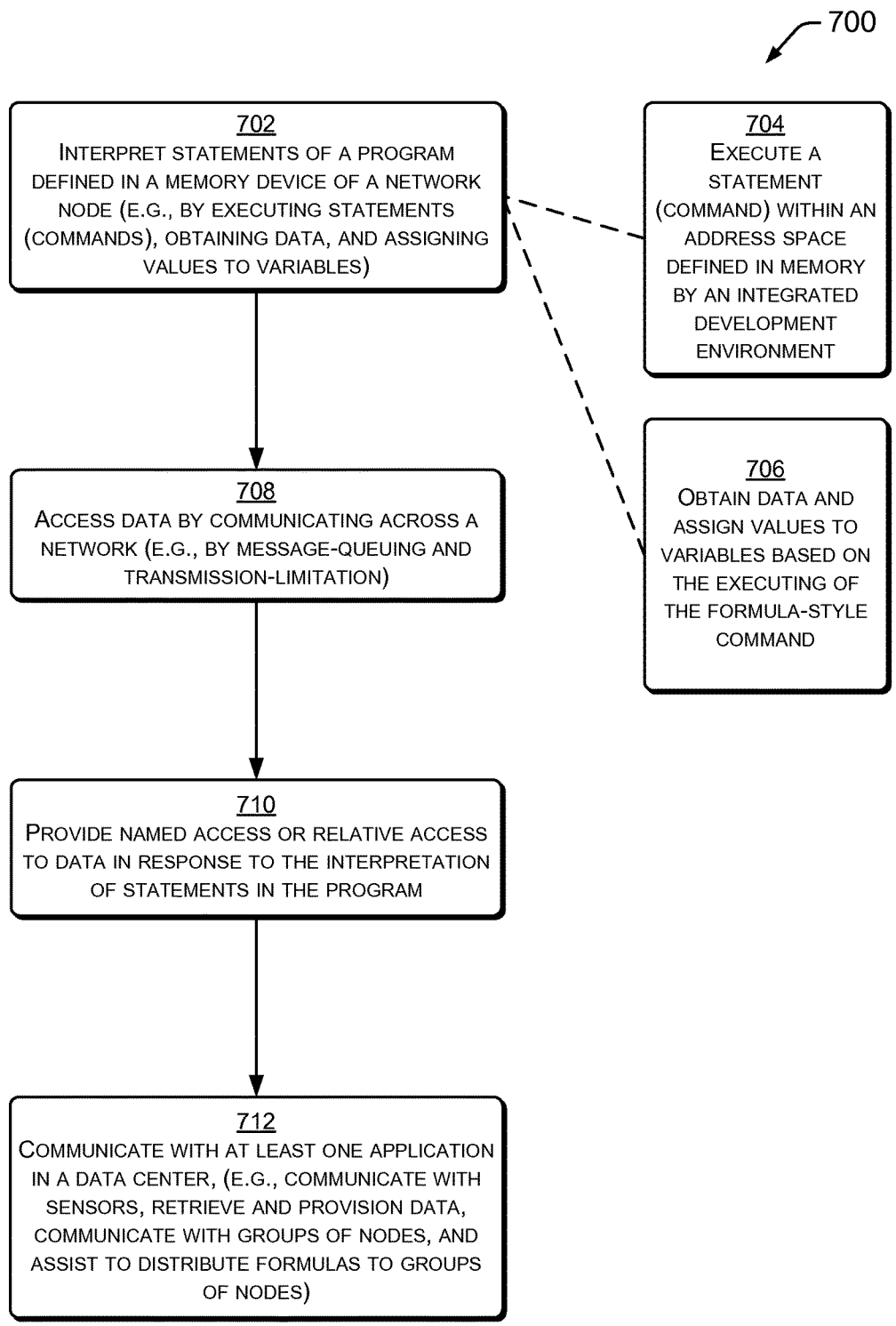
FIG. 7 is a flow diagram showing a first example method for operating an application using a formula-driven programming-environment within a network node.

FIG. 7 is a flow diagram showing an example method 700 for operating application(s) using a formula-driven programming-environment within a network node. In one example, the network node may be any of nodes 104-114 of FIG. 1, nodes 204-208 of FIG. 2 or nodes 602-618 of FIG. 6. However, the method 700 is generally applicable, and the nodes indicated above should be considered to be representative, and not exhaustive, examples of nodes that may be used to implement method 700. The formula-driven programming-environment is discussed with occasional reference to formula-driven programming-environment 426 of FIGS. 4 and 5; however, the method 700 is not limited to environment 426. Moreover, the method 700 may be performed using only some, or all, of the blocks shown.

At block 702, statements of a program defined in a memory device of a network node may be interpreted. In the example of FIG. 4, a plurality of programs or applications 428-432 are configured for use with the programming environment 426. These applications 428-432 may include a plurality of statements, each of which may be interpreted as the application is executed. In the example of FIG. 5, the formula manager 508 may be used to interpret the statements; however, another program or subroutine may be used to provide this functionality.

Blocks 704 and 706 describe example and/or optional techniques for the statement interpretation techniques of block 702. At block 704, a formula-style command may be executed within an address space defined in the memory device by the integrated development environment. Accordingly, the application or program is confined to a well-defined and limiting address space (e.g., a "sandbox"). The confinement advantageously prevents the application from interfering, accidentally or intentionally, with other programs and/or data. Accordingly, block 706 shows that data may be obtained (e.g., from sensors 410 and/or metrology devices 412) and values may be assigned to variables based on the execution of the formula-style command(s).

At block 708, data may be accessed by communicating across a network (e.g., by message-queuing and transmission-limitation). In one example, data may be accessed and/or transmitted using message-queuing techniques, wherein messages are queued for orderly and limited transmission over a network. Transmission-limitation prevents an application from flooding part or all of a network with messages or packet traffic, which could result in degraded network performance, lowered battery life of network nodes and other detriments. In the example of FIG. 2, nodes 204-208 access data from devices 210-232, over a local or personal area network. In the example of FIG. 6, Groups A-C may request or access data from nodes in other groups. Additionally, nodes in the examples of FIGS. 1 and 2 may communicate with the distributed analytics server 116 and/or a third party application server 118, and may thereby access data by communicating across a network.

At block 710, named or relative access to data may be provided in response to the interpretation of statements in the program. Named access may provide a complete address of the data, which may include the name or address of a node containing the data, and/or a specific address on the node. Relative access may provide an address of the data (e.g., on a first node) that is based at least in part on a location of a second node. For example, relative access may indicate data based on a relationship between a parent-node and a child-node. Within the context of the data transfer, the address may be understood relative to the sending and/or receiving node. In an example, a second node within a network may be identified based on a relationship to a first node, and data may be obtained from the second node using addressing based on the relationship.

At block 712, communication may be established with at least one application, such as in a data center, a second network node, or any remote computing device. More generally, a node may communicate with sensors, retrieve and provision data, communicate with groups of nodes, and assist to distribute formulas to groups of nodes. The communication may use the named or relative access addressing, may be made across portions of a network using message-queuing and/or transmission-limitation techniques.

Figure 8:
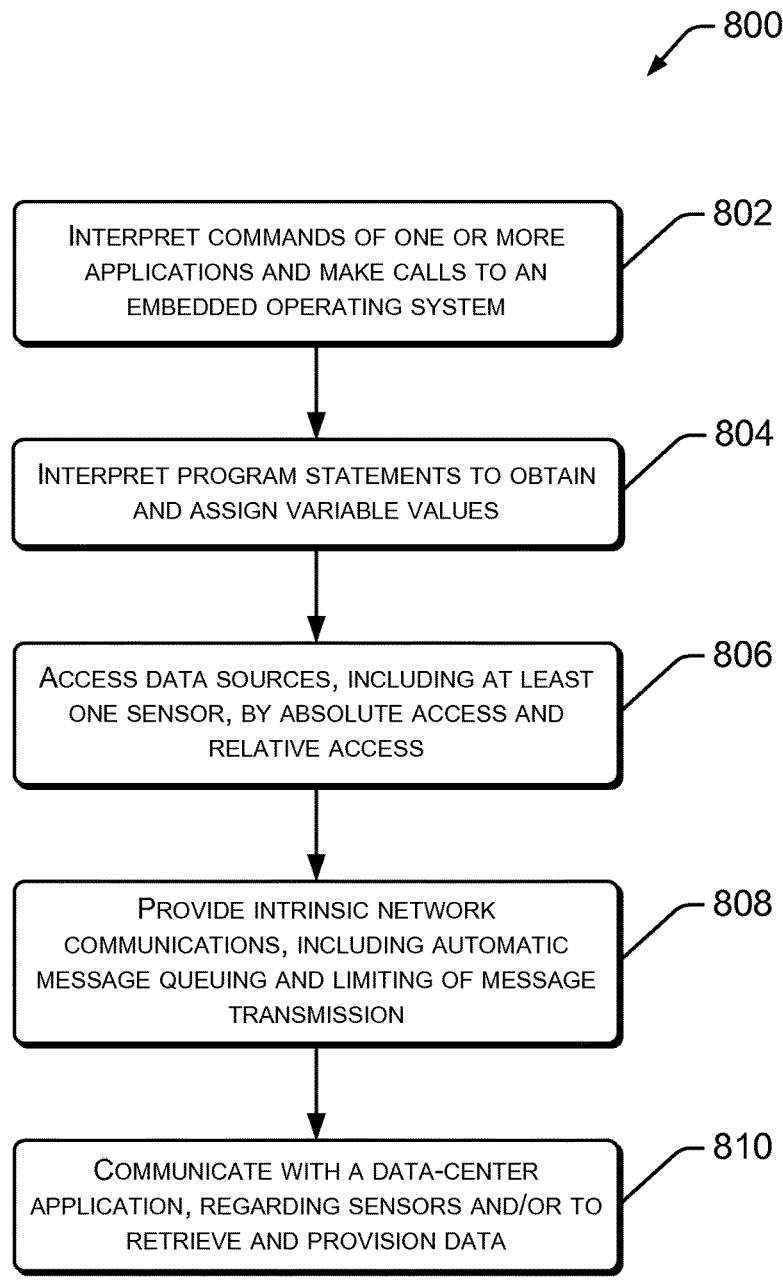
FIG. 8 is a flow diagram showing a second example method for operating an application using a formula-driven programming-environment within a network node.

FIG. 8 is a flow diagram showing an example method 800 for operating an application using a formula-driven programming-environment within a network node. In one example, a formula-driven programming-environment may be configured to interpret commands of one or more applications and to make calls to the embedded operating system. At block 802, commands or program statements of one or more applications may be interpreted, such as by a formula-driven programming-environment. The commands may make calls to, or communicate with, an embedded operating system, various sensors, metrology devices, storage devices, network nodes and other network-connected devices. In one example, the program statements may be interpreted by the program or formula manager 508 of FIG. 5. At block 804, program or formula statements may be interpreted to perform an indicated action. In one example, the interpretation may obtain values and assign the values to variables, such as by operation of the variable manager 512 of FIG. 5. At block 806, data sources may be accessed, including at least one sensor, by absolute (i.e., named access) and/or relative access. In one example, addressing may be managed by an address manager, such as address manager 504 of FIG. 5. At block 808, intrinsic network communications may be provided, including automatic message queuing and limiting of message transmission. In one example, the intrinsic network communications may be provided by the communication manager 502 of FIG. 5. At block 810, a data-center application may be communicated with regarding sensor data, retrieval and/or provisioning of data, or to manage groups and distribute formulas. In one example, the data center communication may managed by an appropriate coordinator or manager, such as the application coordination manager 506 of FIG. 5.

Figure 9:
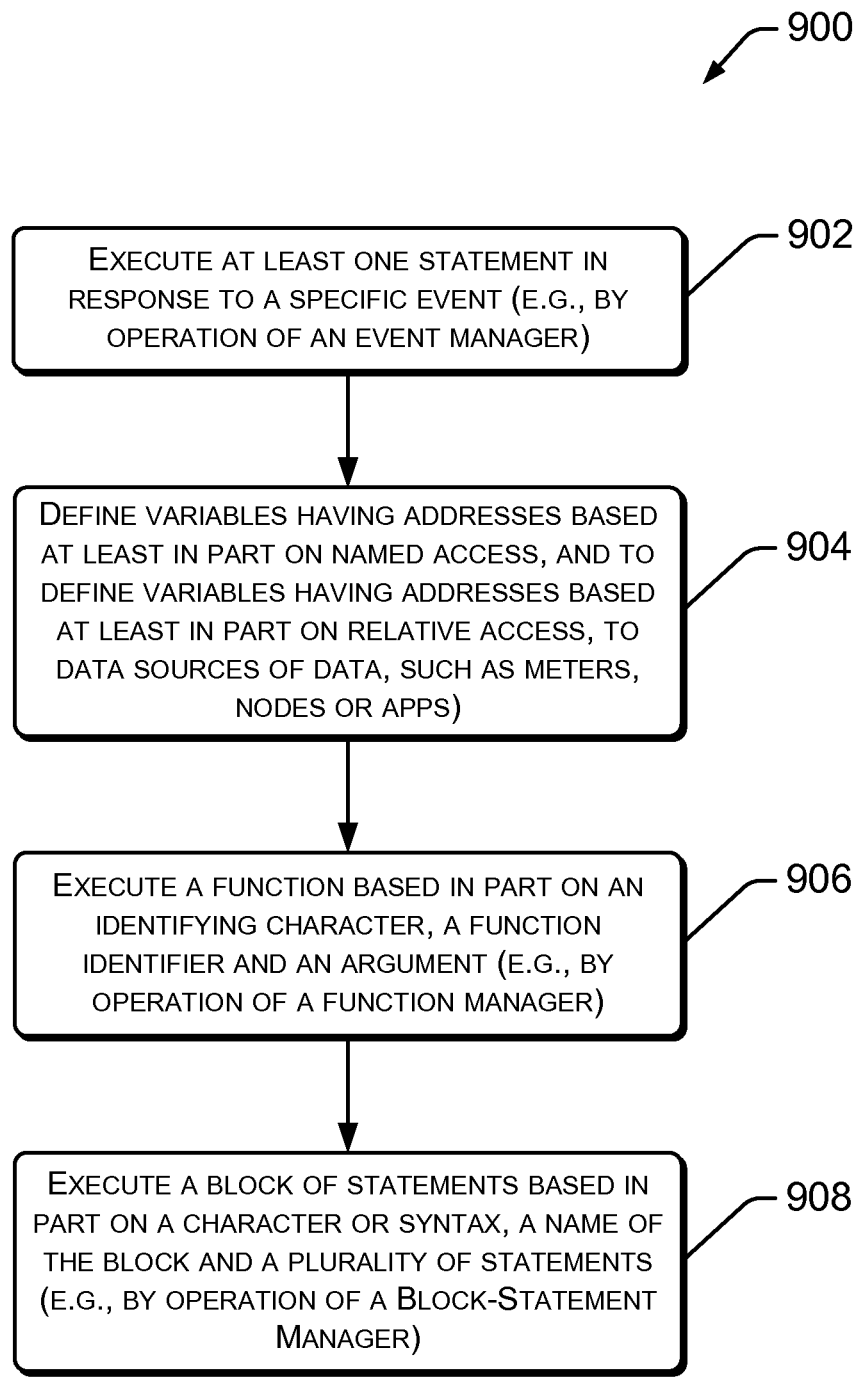
FIG. 9 is a flow diagram showing a third example method for operating an application using a formula-driven programming-environment within a network node.

FIG. 9 is a flow diagram showing an example method 900 for operating an application using a formula-driven programming-environment within a network node. In one example, the formula-driven programming-environment is configured to make calls to the operating system and to interpret statements of one or more applications. At block 902, at least one statement in a program may be executed or interpreted in response to a specific event. In one example, statements may be interpreted at least in part in response to action by an event manager, such as event manager 510 if FIG. 5. At block 904, one or more variables may be defined having addresses based at least in part on named access, and one or more variables may be defined having addresses based at least in part on relative access. The variables may access sources of data, such as meters, nodes or apps. In one example, a variable definition manager may utilize local (or absolute or defined addressing) and relative addressing of data sources, such as meters, nodes or applications. At block 906, a function may be executed, based at least in part on an identifying character or syntax, a function identifier and an argument. The function may be executed by operation of, or in response to, a function manager, e.g., function manager 514 of FIG. 5. At block 908, a block of statements may be executed based at least in part on an indicator character, a name of the block and a plurality of statements. The block of statements may be executed based at least in part on operation of, or in response to, a block-statement manager, e.g., block statement manager 516 of FIG. 5.

Example Implementations

A number of representative and/or example implementations are discussed below. These examples are not an exhaustive or complete catalog of the techniques discussed herein, but are evocative of their structure and operation.

In one example, a method of operating a formula-driven programming-environment (426) within a network node is provided. Statements of a program or application defined in a memory device of the network node may be interpreted and/or executed (702) by the formula-driven programming-environment. In the example, the interpreting may include executing a command (704) within a constrained address space defined in the memory device by the formula-driven programming-environment. The interpreting may include obtaining data and assigning values (706) to variables based on the executing of the command. Data may be accessed (708) from a second node by the interpretation of the statements in the program and communicating over a network (102). The communicating may include queuing a message for transmission by the formula-driven programming-environment. Queuing a message may include providing (710) named access or relative access to data in response to the interpretation of the statements in the program. Named access or addressing may include a full or complete address, while relative access or addressing may provide only a partial address, which is sufficient if considered within a context or implied network topology of the sender and/or recipient. The queuing and transmission of messages may include communicating (712) with at least one application located on a remote computing device in response to the interpretation of statements in the program. Such a remote computing device may include a server or other device at a home or central office.

The formula-driven programming-environment may include, separately or together with any of the above examples where consistent, one or more syntaxes related to functionality available to 3rd party applications developers. The syntax may utilize almost any character or sequence of characters. For example, the identifying syntax could be "@", which could be utilized to identify a named function that was then defined and/or invoked. In one example, the named function could be an averaging function, e.g., called "average," and arguments could be supplied in a relationship (such as following the function name) that would be used by the function. Thus, thus, the formula-driven programming-environment could include a syntax (e.g., a character indicating a function), a named of a function (e.g., "average," and one or more arguments (e.g., values to be averaged).

The formula-driven programming-environment may include, separately or together with any of the above examples where consistent, techniques to provide relative access to data. Relative data access provides flexibility to the programmer, and may eliminate the need to hardcode addresses, and/or provide full addresses, in many instances. For example, data may be obtained from downstream nodes for transmission to upstream nodes, or the reverse. In another example, data may be accessed at locations including local nodes, neighbor nodes, arbitrary groups of nodes, or parent, sibling and child nodes. The addresses used to obtain the data may be complete addresses of network locations, or may be relative addresses that are sufficient when viewed in a particular network context.

The formula-driven programming-environment may include, separately or together with any of the above examples where consistent, techniques to limit transmission of messages and/or data over a network, as required and/or to below a threshold. The techniques may limit the amount of data sent by an application running within a network and utilizing the formula-driven programming-environment. By limiting the number of messages, packet and/or the amount of data, poorly written and/or maliciously intended applications are unable to flood or over-utilize portions of the network.

The formula-driven programming-environment may include, separately or together with any of the above examples where consistent, techniques to define an addressing mechanism, standard and/or technique(s) that is usable by applications operable using and/or within the environment. In one example, a formula structure may include a core addressing mechanism usable by applications within the formula-driven programming-environment. The addressing mechanism may include one or more of a node name (e.g., name of a service point within an AMI network), a channel for transmission and/or a time or time-offset. The formula-driven programming-environment may access data using a node:variable syntax. Using these elements, the indicated nodes may establish communications over a known channel and a known time.

The formula-driven programming-environment may include, separately or together with any of the above examples where consistent, techniques for message-queuing that is "transparent" to the programmer and/or application. Advantageously, transparent communications do not require any knowledge by the programmer using the integrated development environment of the details of message queuing. The transparent communications may be supported by the well-defined formula-driven programming-environment. Accordingly, queuing a message for transmission by the formula-driven programming-environment may be performed transparently, and may include sensor data, constants, derived data and/or commands for transmission over the network for transmission over the network.

The formula-driven programming-environment may include, separately or together with any of the above examples where consistent, techniques for relative addressing. In one example, relative addressing may include identifying a second node within a network based on a relationship to the network node and obtaining data from the second node. The relationship may include relationships based on network topology, and may be made with reference to the topology manager 518.

The formula-driven programming-environment may include, separately or together with any of the above examples where consistent, techniques for problem or event validation. In one example, a problem validation technique may be used to confirm whether nodes having different locations within a network topology similarly recognize a problem or event, including a nature and location of the problem or event. In the example, a problem or event, such as with the network and/or with a network node, may be recognized. The problem or event may be recognized by a network node or other device. Once recognized, the node or other network device may determine if a problem or event, and/or the same or different problem or event, is recognized by parent nodes of the network node, child nodes of the network node and/or a sibling nodes of the network node. By confirming the same problem or event, or by considering differences in perception of the problem or event, the network situation and status may be better understood.

The formula-driven programming-environment may include, separately or together with any of the above examples where consistent, techniques for configuring and using an embedded system (e.g., an embedded operating system). In one example, a Linux-based embedded system (or the like), a rules- and/or calculation-engine and/or formula structures may be operated in one or more network nodes. The rules engine and a calculation engine may both be configured to utilize resources provided by the embedded system, while using both local addresses and relative addresses of nodes and data on the network.

The formula-driven programming-environment may include techniques to provide one or more functionalities, which may be configured as "managers" within a software and/or hardware environment(s). Example functionalities may include obtaining and assigning variables, intrinsic network communications, named access and relative access to data, and data-center access. In one example, at least one sensor 410, an embedded operating system 414, configured to communicate with the at least one sensor, and a formula-driven programming-environment 426 may be configured to interpret commands 802 of one or more applications and to make calls to the embedded operating system. In the example, the formula-driven programming-environment may include a variable manager 512, to obtain and assign 804 variable values, an address manager 504, to provide access 806 to data sources, including the at least one sensor, by absolute access or relative access, a communications manager 502, to provide intrinsic network communications 808, including automatic message queuing and limiting of message transmission, and an applications manager 506, to communicate 810 with a data-center or other application regarding sensor data and to retrieve and provision data.

The formula-driven programming-environment may include, separately or together with any of the above examples where consistent, techniques for configuring a name of a variable can indicate a location at which the data is stored. There can be a storage location (e.g., "server"), a syntax (e.g., a colon), and a variable name (e.g., "output"). In this specific example, server:output indicates that data associated with the variable name "output" is located at a device called "server." Accordingly, an address manager may be configured to define variables based on a storage location, a syntax, and a variable name.

The formula-driven programming-environment may include, separately or together with any of the above examples where consistent, techniques may provide for notification of an event. The notification may be made by the programming environment to an application running in the environment. Such notifications may be utilized with a syntax and a name, and may be in response to time, e.g., #Daily or #hourly. The notification may be used by applications as a trigger to perform activities, such as variable assignments, functional evaluations and statement execution. In one example, an event manager handles this. In a further example, the formula-driven programming-environment may include an event manager, to respond to an event notification and to trigger variable assignment to put data into appropriate data structures, functional evaluation to calculate a value of a function given an input value and/or statement interpretation within the formula-driven programming-environment.

The formula-driven programming-environment may include, separately or together with any of the above examples where consistent, techniques may provide for definition of blocks of statements. The blocks of statements may be utilized by a syntax and a name, such as %Update. The block may be tied to an event. Using example syntax, an update event, performed daily, may be written as #Daily [%Update]. In a further example, the formula-driven programming-environment may be configured to execute a block of statements in response to an event notification, wherein the block of statements is indicated by a defined syntax, a name of the block of statements is located with respect to the defined syntax, a plurality of statements are associated with the name of the block of statements.

The formula-driven programming-environment may include, separately or together with any of the above examples where consistent, techniques may provide for a function call. In an example, a function call may include a syntax and a name, such as @HandDisplay. The formula-driven programming-environment may allow text output as needed, to provide context for the function, such as @HandDisplay ("the output is", local:total). In one example, the formula-driven programming-environment may provide a function definition comprising an indicating syntax and a call to the formula-driven programming-environment or to the embedded system.

The formula-driven programming-environment may include, separately or together with any of the above examples where consistent, techniques may provide for limits to third party applications to prevent them from overwriting important memory locations and/or over-utilization of local resources. In the context of an AMI environment, the network owner/manager is the first party, and utility customers are the second party. Third party developers may develop applications for use within the programming environment 426 on one or more nodes. The programming environment may limit interpretation of commands to a defined area of memory, and limit program utilization to prevent excessive resource consumption.

The formula-driven programming-environment may include techniques for providing tools to application developers. The tools may include variables, variable definition and variable addressing (e.g., local:output); events and event definitions, which may be triggered upon the event (e.g., #Daily); functions (e.g., @Average); and block statements (e.g., %AlarmLocal). A programming-environment and a network node may form a system, including at least one sensor 410; an embedded operating system 414, in communication with the at least one sensor; and a formula-driven programming-environment 426, configured to make calls to the embedded operating system and to interpret statements of one or more applications. The formula-driven programming-environment may include a variable definition manager 512 configured to define 904 variables having addresses based at least in part on named access, and to define variables having addresses based at least in part on relative access, to data sources, an event manager 510 configured to execute 902 at least one statement in response to a specific event, a function manager 514 configured for to execute a function 906 based at least in part on an identifying syntax, a function identifier, and an argument, and a block statement manager 516 configured to execute 908 a block of statements at least in part by recognizing an indicating syntax, a name of the block of statements, and a plurality of statements associated with the name.

The formula-driven programming-environment may include, separately or together with any of the above examples where consistent, techniques may provide event management includes a plurality of defined events (e.g., "alarm"). By recognizing a defined event, the system may execute statements associated with that event. In one example, the event manager configured to define a plurality of events, provide notice upon occurrence of an event from among the plurality of events, and execute a block of statements in response to the notice.

The formula-driven programming-environment may include, separately or together with any of the above examples where consistent, techniques for expressing variables in a format such as location:name, using any desired syntax. A variable definition manager may use a two-part, three-part (or plural-part) format, which may include a location on which variable information is stored, some type of syntax and a name of a variable.

The formula-driven programming-environment may include, separately or together with any of the above examples where consistent, techniques for the creation and/or use of functions. Functions may be executed by the integrated development environment, such as by a function manager. In one example, only functions provided by the formula-driven programming-environment are allowed to execute. In another example, functions developed by third party developers are restricted in their actions, such as by confining the functions to a prescribed address space.

The formula-driven programming-environment may include, separately or together with any of the above examples where consistent, techniques for mixing two or more events, functions and/or block statements. In one example, a block or sequence of statements may be configured and/or executed in response to an event. The block of statements may including statement(s) executed in response to an event, a function and/or a name of a (further) block of statements.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system, comprising:
at least one sensor;
one or more nodes in a network;
a processor configured to input data from the at least one sensor and to enable a formula-driven programming-environment defined on a memory device of a node in the network, the formula-driven programming-environment further comprising one or more managing components providing operations for at least a first program and a second program, and configured to perform acts comprising:
interpreting statements of the first program operable within a first address space defined in the memory device by operation of the formula-driven programming-environment, and interpreting statements of the second program operable within a second address space defined in the memory device by operation of the formula-driven programming-environment;
interpreting addresses within statements of the first program based on a first network topology, and interpreting addresses within statements of the second program based on a second network topology, wherein a first upstream data path from the node in the network, based on the first network topology, and a second upstream data path from the node in the network, based on the second network topology, are different, and wherein each of the first upstream data path and the second upstream data path include a path to a third party server, a second node, a utility company's office, or a remote computing device;
limiting, by operation of the formula-driven programming-environment, statements of the first program to the first address space, and statements of the second program to the second address space;
limiting, by operation of the formula-driven programming-environment, message-queuing and message-transmission of the first program and the second program;
obtaining data from the at least one sensor and assigning values to variables by operation of the formula-driven programming-environment; and
communicating the data obtained from the at least one sensor, over a network and by operation of the first program, using an upstream path associated with the first program, and communicating the data obtained from a metrology device, over the network and by operation of the second program, using the upstream path associated with the second program, wherein the communicating further comprises:

queuing of sensor data, constants, derived data and/or commands for transmission over the network; and
transmitting the queued data transparently by operation of the formula-driven programming environment;
wherein the one or more managing components of the formula-driven programming-environment are further operational for:
providing a context, indicating a type of address to be used for network communications based at least in part on the first network topology or the second network topology;
performing low-level coding and addressing as required for message queuing;
configuring addressing syntax according to one or more formats;
coordinating with at least one remote operating program to utilize one or more formulas, events, variables, functions, and/or statement blocks in at least the first program or the second program;
identifying a second node within the network and a relationship of the second node to the node; and
obtaining data from the second node using the relationship.

2. The system as recited in claim 1, additionally performing acts comprising:
providing notice upon occurrence of an event from among a plurality of defined events; and
executing a block of statements in response to the provided notice.

3. The system as recited in claim 2, wherein the block of statements comprises two or more of:
a statement executed in response to an event;
a function; and
a name of a block of statements.

4. The system as recited in claim 1, wherein:
the second network topology comprises a utility company's office; and
the first network topology comprises a windmill or a solar panel.

5. The system as recited in claim 1, wherein interpreting the statements comprises interpreting statements having a location on which variable information is stored and a name of a variable.

6. The system as recited in claim 1, wherein the acts additionally comprise limiting functions to only those provided by the formula-driven programming-environment.

7. A method implemented at least in part by a network node, the method comprising:
operating a formula-driven programming-environment located within the network node further comprising one or more managing components providing operations for at least a first program and a second program;
interpreting, by operation of the formula-driven programming-environment, statements of the first program operable within a first address space defined in a memory device of the network node, and statements of the second program operable within a second address space defined in the memory device of the network node;
interpreting absolute addresses or relative addresses within the statements of the first program based on a first network topology and interpreting absolute addresses or relative addresses within the statements of the second program based on a second network topology, wherein an upstream path from the network node, based on the first network topology is different from an upstream path from the network node based on the second network topology, and wherein the upstream path based on the first network topology and the upstream path based on the second network topology includes a path to a third party server, a second network node, a utility company's office, or a remote computing device;

limiting, by operation of the formula-driven programming-environment, statements of the first program to the first address space, and statements of the second program to the second address space;

limiting, by operation of the formula-driven programming-environment, message-queuing and message-transmission of the first program and the second program;

obtaining data from a metrology device of the network node and assigning values to variables by operation of the formula-driven programming-environment; and communicating the data obtained from the metrology device, over a network and by operation of the first program, using the upstream path associated with the first program, and communicating the data obtained from the metrology device, over the network and by operation of the second program, using the upstream path associated with the second program, wherein the communicating further comprises:

queuing of sensor data, constants, derived data and/or commands for transmission over the network; and transmitting the queued data transparently by operation of the formula-driven programming environment;

wherein the one or more manacling components of the formula-driven programming-environment are further operational for:

providing a context, indicating a type of address to be used for network communications based at least in part on the first network topology or the second network topology;

performing low-level coding and addressing as required for message queuing;

configuring addressing syntax according to one or more formats;

coordinating with at least one remote operating program to utilize one or more formulas, events, variables, functions, and/or statement blocks in at least the first program or the second program;

identifying a second node within the network and a relationship of the second node to the network node; and obtaining data from the second node using the relationship.

8. The method as recited in claim 1, wherein:
the first network topology is based on an electrical distribution grid and includes a utility company's office; and
the second network topology includes a third party server.

9. The method as recited in claim 1, wherein interpreting the statements of each of the first and second programs comprises:
evaluating a syntax; and
evaluating an argument.

10. The method as recited in claim 1, wherein obtaining data from a metrology device comprises use of syntax comprising node: variable.

11. The method as recited in claim 1, wherein the communicating, over the network, can be limited to levels below a threshold.

12. The method as recited in claim 1, additionally comprising:

recognizing an event; and
determining if the event was also recognized by:
a parent node of the network node;
a child node of the network node; or
a sibling node of the network node.

13. A node, comprising:
at least one sensor;
a memory device;
a processor;
an embedded operating system defined on the memory device and executed by the processor, and configured for communication with the at least one sensor; and
a formula-driven programming-environment defined on the memory device and executed by the processor, the formula-driven programming-environment further comprising one or more managing components providing operations for at least a first program and a second program and configured to perform acts comprising:

interpreting statements of the first program operable within a first address space defined in the memory device of the node, and interpreting statements of the second program operable within a second address spaces defined in the memory device of the node, the interpreting of statements performed by operation of the formula-driven programming-environment;

providing access to data sources, including the at least one sensor and by action of the formula-driven programming-environment, using addressing information that provides either absolute addressing or relative addressing, assigning variables to put data from the data sources into appropriate data structures;

interpreting absolute addresses or relative addresses within statements of the first program based on a first network topology, and interpreting absolute addresses or relative addresses within statements of the second program based on a second network topology, wherein upstream paths from the node, based on the first network topology and the second network topology, are different, and wherein the upstream path based on the first network topology and the upstream path based on the second network topology includes a path to a third party server, a second node, a utility company's office, or a remote computing device;

limiting statements of the first program to the first address space, and statements of the second program to the second address space;

limiting, by operation of the formula-driven programming-environment, message-queuing and message-transmission of the first program and the second program; and communicating at least some the data obtained from the data sources, over a network and by operation of the first program, using the upstream path associated with the first program, and communicating at least some of the data obtained from the data sources, over the network and by operation of the second program, using the upstream path associated with the second program, wherein the communicating further comprises:

queuing of sensor data, constants, derived data and/or commands for transmission over the network; and transmitting the queued data transparently by operation of the formula-driven programming environment;

wherein the one or more managing components of the formula-driven programming-environment are further operational for:

providing a context, indicating a type of address to be used for network communications based at least in part on the first network topology or the second network topology;

performing low-level coding and addressing as required for message queuing;

configuring addressing syntax according to one or more formats;

coordinating with at least one remote operating program to utilize one or more formulas, events, variables, functions, and/or statement blocks in at least the first program or the second program;

identifying a relationship of the second node to the node; and obtaining data from the second node using the relationship.

14. The node as recited in claim 13, wherein:
the first network topology includes a utility company's office; and
the second network topology includes a third party server.

15. The node as recited in claim 13, wherein the acts further comprise defining variables based on a storage location, a syntax, and a variable name.

16. The node as recited in claim 13, wherein the acts additionally comprise
evaluating functions to calculate a value of a function given an input value.

17. The node as recited in claim 13, wherein the formula-driven programming-environment is configured to execute a block of statements in response to an event notification, wherein:
the block of statements is indicated by a defined syntax;
a name of the block of statements is located with respect to the defined syntax; and
a plurality of statements are associated with the name of the block of statements.

* * * * *